July 25, 1939.　　F. W. SULLIVAN, JR　　2,166,933
CONVERTING HYDROCARBON OILS
Filed Feb. 11, 1935
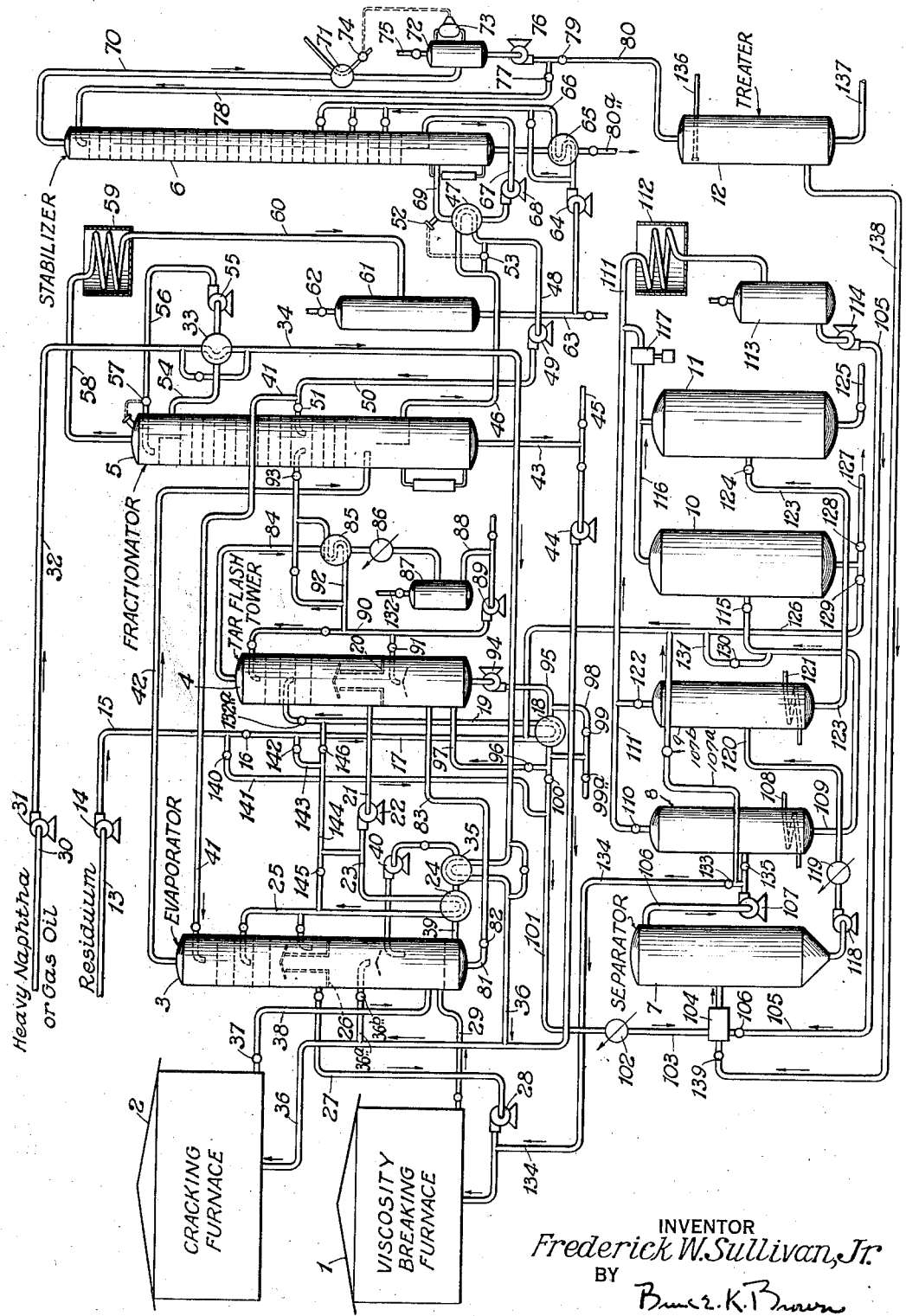
INVENTOR
Frederick W. Sullivan, Jr.
BY
ATTORNEY Patented July 25, 1939

2,166,933

UNITED STATES PATENT OFFICE 2,166,933

CONVERTING HYDROCARBON OILS

Frederick W. Sullivan, Jr., Hammond, Ind., assignor to Standard Oil Company, Chicago, Ill., a corporation of Indiana Application February 11, 1935, Serial No. 5,993

2 Claims. (Cl. 196—50)

This invention relates to a process of converting heavy hydrocarbon oils into light hydrocarbon oils, particularly oils boiling within the gasoline boiling range. The process is especially adapted to the cracking operation known as viscosity breaking wherein a heavy residual stock is initially subjected to cracking conditions which bring about the formation of intermediate hydrocarbon oils which are later subjected to further cracking conditions resulting in their conversion into gasoline. An object of the invention is to increase the yield of gasoline obtainable from residual charging stocks. Another object of the invention is to increase the duration of operation of a cracking unit and reduce frequency of shutdown for cleaning. A specific feature of the process is the extraction of the residual charging stock and the residual tar produced by the viscosity breaking operation to recover therefrom fractions more suitable for the viscosity breaking process and rejecting fractions undesirable therein. The process will be readily understood by referring to the accompanying drawing which forms a part of this specification.

Referring to the drawing, 1 is a viscosity breaking furnace, and 2 is a cracking furnace especially adapted for vapor phase cracking of gas oil and heavy naphtha desired to be reformed. The number 3 represents an evaporator tower into which both cracking furnaces discharge. The number 4 represents a tar flash tower and 5 is a fractionating tower used for separating the gasoline from the heavier hydrocarbons. Number 6 represents a stabilizer tower, and 7 is a propane separator. Numbers 8 and 9 are separators and/or flash drums, while 10 and 11 are flash drums and 12 is a propane purifier.

In carrying out the operation of the process a residual oil is introduced by line 13. This oil may suitably be a 15–40% residuum from Mid-Continent crude oil having a gravity of between 10 and 30° A. P. I. but a similar heavy residuum from any desired crude petroleum may be employed. After passing charging pump 14 the residuum flows by line 15 through valve 16 and line 17 to heat exchanger 18, thence by line 19 and into the upper section of tar flash tower 4. Here it is further heated by an ascending current of hot vapors and collected on trap-out plate 20 whence it is delivered by line 21, pump 22 and line 23 to heat exchanger 24 where it is further heated and thence conducted by line 25 to evaporator tower 3. In this tower it is heated by an ascending current of hot vapors and collected on trap-out plate 26 whence it is conducted by line 27 and pump 28 to the viscosity breaking furnace No. 1.

This furnace is of the tubular type in which the oil flows through a series of coils at high velocity and is heated to a temperature of between 850 and 925° F., preferably about 875–900° F. The pressure employed in the viscosity breaking furnace is suitably about 200 lbs. per sq. in., but pressures from 100 to 800 lbs. may be used. Heavy hydrocarbons are converted into lighter hydrocarbons, mostly above the gasoline range, about 5 to 10% only of gasoline being formed. After leaving the furnace by line 29 the hot oil and vapors are discharged into the base of evaporator tower 3. Here they are commingled with vapors of cracked heavy naphtha and gas oil subsequently to be described.

A clean gas oil or a heavy naphtha which is of insufficient knock rating to be suitable for gasoline is introduced by line 30 and pump 31 into line 32 where it is conducted through heat exchanger 33 and line 34 to heat exchanger 35 and thence by line 36 to cracking furnace No. 2. Here it is subjected to a temperature of between 915 and 1050° F., depending on the composition of the stock and the degree of cracking desired. At higher temperatures more cracking and more gas is produced but the product is also of higher knock rating. The pressure in this operation is suitably maintained between 200 and 750 lbs. per sq. in. Charging gas oil and heating to 925° F., there will usually be formed in this operation about 12 to 20% of gasoline per pass.

The gas oil and/or heavy naphtha vapors leaving furnace No. 2 pass through valve 37 and are conducted by line 38 to evaporator tower No. 3 where a pressure of 50 to 200 lbs. per sq. in. may suitably be maintained. A liquid level is maintained in the base of this tower, and coking is prevented by circulating through line 39, heat exchangers 24 and 35 and pump 40. Reflux for the base of tower 3 is provided by line 36a controlled by valve 36b. The uncondensed vapors rise through the tower and are subjected to reflux introduced by line 25 previously described and by line 41. The vapors are then led by line 42 to bubble tower No. 5 where they are further fractionated to separate the gasoline from heavier constituents. The condensed hydrocarbons are recycled by line 43 and pump 44 to line 36 and thence back to furnace No. 2. A portion of this stock may be eliminated from the system by line 45, if desired.

Part of the reflux from tower 5 is trapped out by line 46 and flows thence to heat exchanger 47 and is returned by line 48 and pump 49 and line 50 to the bubble tower through valve 51. Any desired portion of this oil may be diverted through line 41 to the evaporator tower as reflux previously described. An automatic controller 52 regulates by-pass valve 53 to control the temperature of the gasoline leaving heat exchanger 47.

Reflux is supplied to the fractionator 5 by trapping out a portion of the gasoline in the upper part thereof by line 54 leading to heat exchanger 33, pump 55 and line 56, returning to the fractionator tower through regulating valve 57.

Gasoline vapors are conducted by line 58 to condenser 59 and line 60 to collector drum 61 which is provided with a vent line and valve 62 for eliminating dry gas from the system under pressure. The total liquid distillate products collected in the drum, are led by line 63 to pump 64 and heat exchanger 65, thence into stabilizer tower 6 by line 66. The pressure in this tower may suitably be about 250–300 lbs. per square inch and heat is supplied by circulating bottoms through line 67, pump 68 and heat exchanger 47 back to the tower by line 69. In the stabilizer tower 6 the propane and lighter hydrocarbons are separated from the gasoline, being taken off by vapor line 70 through condenser 71 and into separator drum 72. A liquid level is carried in drum 72 and the amount of vapors condensed in condenser 71 is controlled automatically by liquid level controller 73 and regulating valve 74 on the condenser water line. Uncondensed vapor is discharged by line 75. Liquid propane is withdrawn by pump 76 and a portion is returned by valve 77 and line 78 to serve as reflux in the stabilizer. Another portion of the propane is discharged through valve 79 and line 80, as will be hereinafter described. Stabilized gasoline is withdrawn from the base of column 6 by valved line 80a, leading through heat exchanger 65 previously described.

Returning now to the operation of the evaporator tower 3, this may suitably be held at a pressure of 200 lbs. per sq. in, and tar is withdrawn therefrom by line 81 and valve 82 through line 83 to tar flash tower No. 4. The pressure in this tower may be substantially atmospheric as a result of the drop in pressure through valve 82. As a result of this reduction in pressure a considerable proportion of the tar is vaporized by its contained heat and these vapors are passed upwards through trap-out plate 20 and descending reflux previously described. Additional reflux is provided by condensing vapors leaving the top of the tower by line 84 and heat exchanger 85, cooler 86, separator drum 87, line 88, pump 89 and thence by line 90 back to the flash tower. A portion of the reflux may be introduced below the trap out plate 20 through valve 91, if desired. Also a portion may be introduced into the bubble tower 5 by line 92 and valve 93.

Unevaporated portions of the tar collected in the base of tower 4 are withdrawn by pump 94, line 95 through heat exchanger 18 whence a portion may be returned by valve 96 and line 97 to tower 4 as a flux oil to prevent excessive temperatures and resulting coking. Heat exchanger 18 may be by-passed by line 98 and valve 99, if desired.

A portion of the heavy tar from exchanger 18 is withdrawn through valve 100 and line 101 to exchanger 102 which serves to adjust the temperature to the point desired for subsequent operations. The tar at this point consists of heavy polymerization products resulting from the cracking operation, both viscosity breaking and vapor phase cracking, together with high boiling constituents of the original residuum charging stock supplied to the viscosity breaking operation. It will ordinarily have a gravity of between 5 and 15° A. P. I. with a flash point of approximately 300° F. The high boiling polymer products from the cracking operation which are present in this tar make it substantially impossible to crack it further and obtain any further yields of gasoline. The only way in which further gasoline can be obtained from this stock heretofore has been coking to produce gasoline and a charging stock of intermediate boiling point as described in U. S. application, Ser. No. 329,419 of R. E. Wilson, filed December 31, 1928, and equivalent Canadian Patent 309,109 granted March 3, 1931. In my process I employ a unique method of separating from the coke-forming constituents of the tar those paraffinic type hydrocarbons which may be further cracked to produce gasoline without undue difficulty from coking.

The tar which is conditioned in exchanger 102 at a temperature of about 200–400° F. is conducted by line 103 to mixer 104 where it is thoroughly mixed with a stream of liquid propane introduced by line 105 and valve 106, the proportion of propane being about 2–6 volumes for 1 volume of tar. The mixture which is now at a temperature of 100–170° F., preferably about 125° F., is allowed to separate in drum 7. The upper layer is drawn off through line 106 and pump 107 to drum 8. Here the temperature is further raised by the heat supplied by coil 108 and the temperature is increased to between 200 and 210° F., whereupon further separation takes place, the remainder of the heavy hydrocarbons being deposited and withdrawn by line 109 while the light hydrocarbons, either liquid or vapor, are withdrawn by valve 110 and line 111 to cooler or condenser 112 whence they are led to propane storage reservoir 113. Propane is withdrawn from this reservoir by pump 114 and line 105 previously described.

The heavy hydrocarbon material separated in drum 8 is conducted by line 109 and valve 115 where the pressure is released into drum 10 maintained at substantially atmospheric pressure. The remaining propane is recovered by this drum and passed by vapor line 116 to compressor 117 which returns it to the propane system by line 111.

Likewise naphthenic coke-forming material precipitated in separator 7 is withdrawn by pump 118 through heat exchanger 119 in line 120 to drum 9 supplied with heat by coil 121. The propane vapors are expelled through valve 122 into line 111 where they are led to condensed 112 for recirculation. Residual oil in drum 9 is removed by line 123 and conducted to drum 11 through pressure reducing valve 124 where the pressure is reduced and propane vapors are allowed to flash off through line 116 leading to compressor 117 as previously described. If desired steam may be introduced into the base of drums 10 and 11 for more completely removing propane from the stocks contained therein. Heat required for coils 108 and 121 may suitably be derived from exchanger 102. The propane-free residuum in drum 11 is discharged by line 125 and may be subsequently employed for the manufacture of asphalts, road oils or heavy fuel oils. In the manufacture of asphalts, it is particularly valued because of freedom from paraffin and paraffinic type hydrocarbons undesired in these products.

The residual oil, from which the propane has been removed in drum 10 and which comprises the propane soluble paraffinic portion of the pressure tar withdrawn from flash tower 4, is removed by line 126 leading to line 17 where it is admixed with incoming fresh charging stock, heated in heat exchanger 18 and conducted by line 19 to flash drum 4, as previously described. In this way the paraffinic constituents of the tar are recycled for further cracking while the naphthenic or coke-producing constituents are eliminated by line 125. If desired, part of the paraffinic constituents may be withdrawn by line 127 and valve 128 for cracking on another unit, for the production of lubricating oils or other purposes; also, if desired, flash drum 10 may be cut out of the system by closing valve 115 and valve 129 and opening valve 130 in by-pass line 131, permitting propane-containing oil to flow from line 109 directly into line 126 for recycling to drum 4. The propane which this stock contains is thus released in drum 4 and eventually discharged from separator 87 by line 132. Or oil and propane from line 109 may pass by lines 131, 126, 19, 144 and 25 to drum 3, valves 129, 16, 142, and 132a being closed. Propane vaporized in tower 3 is conducted with the cracked vapors to fractionator 5 and stabilizer 6 as previously described.

In still another modification part of the propane extract withdrawn from the top of drum 7 may be conducted through valve 133 and line 134 to the inlet line 27 leading to viscosity breaking furnace No. 1, valve 135 being closed or partly closed to block off flash drum 8. By operating in this manner propane is vaporized in the viscosity breaking furnace and serves to increase the velocity of the oil traveling therethrough, thus reducing coke deposition in the heating tubes. Before introducing this stock into the furnace by line 134 it may be suitably passed through a heat exchanger, not shown, to conserve heat necessary in the viscosity breaking furnace. I may also deliver the propane oil solution from separator 7 directly to the evaporator tower 3 and/or tar flash tower 4 by opening valve 107b, valves 133, 135, 130 and 129 being closed.

Propane from stabilizer 6, as previously described, is introduced by line 80 into treater 12 where it is subjected to a suitable chemical treatment for the removal of unsaturated hydrocarbons, such as ethylene, propylene and butylene, which would interfere with the subsequent use of the propane and the separation of tar in drum 7, previously described. Any suitable treatment may be used for this purpose, such as treatment with sulfuric acid, aluminum chloride, sodium chloroaluminate, fuller's earth, phosphoric acid, aluminum oxide, etc. Treater 12 is a diagrammatic representation of an apparatus suitable for this purpose, lines 136 and 137 being provided for introducing and removing the chemical agent for absorbing or polymerizing olefines.

The treated propane which may or may not be distilled to remove polymers, is conducted by line 138 through valve 139 and into mixer 104 previously described. Sufficient propane is introduced in this manner to compensate for losses from the propane extraction system, comprising vessels 7 to 11, inclusive.

By another method of operation I may subject the crude residuum charging stock introduced by line 13 to a separation with propane before subjecting it to the cracking reaction. This operation is particularly advantageous in cases where a crude residuum is high in asphalt content and especially difficult to process through the viscosity breaking furnace because of coke deposition. In order to operate the process in this way valve 16 in line 15 is closed and valve 140 is opened to permit the residual charge to pass by line 141 into line 101 and thence to mixer 104 in separator 7, as previously described. In order better to control the temperature in evaporator tower 3, I may by-pass a portion of the fresh charge in line 15 through valve 142 and by-pass line 143 leading directly into line 144, through valve 145 to line 25 leading to tower 3. Exchanger 18 may also be by-passed by opening valve 146, permitting relatively cool stock to flow directly into line 19 entering tar flash drum 4.

As an example of the effect of propane on purifying reduced crude, the following figures may be cited: 15% residue from Mid-Continent crude oil obtained by distillation was treated at a temperature of 126° F. with approximately five times its volume of propane, containing about 25% of propylene, small amounts of ethane and butane. By this treatment the residuum was separated into approximately equal portions of asphaltic and paraffinic constituents, the paraffinic constituent being suitable for charging to the viscosity breaking operation and the asphaltic constituents, having a melting point of 163° F. being eliminated from the system.

By employing the foregoing process of propane extracting a heavy residual oil and tar in a viscosity breaking cracking operation, I am enabled to operate the viscosity breaking furnace at higher temperatures and for longer periods of time without difficulty from coke formation and resulting tube failure. Instead of limiting the viscosity-breaking temperature to approximately 880° F. as has heretofore been the practice I am enabled to increase this temperature to 900–925° F., producing a greater amount of gasoline in this operation than has heretofore been accomplished with heavy residual oils. Because of these more drastic cracking conditions, the stock is also viscosity broken more extensively, yielding a greater amount of relatively volatile cycle oil which is separated by flashing from the viscosity breaker tar. In this way, valuable gasoline producing stock is prevented from being rejected with the tar when operating without propane extraction thereof.

An important advantage of the present process is the increase in gasoline yield resulting from the recovery from the viscosity breaker tar of high boiling constituents of substantially paraffinic character which are eminently suitable for recracking. The high boiling point of these materials present in the original crude oil makes it impossible to separate them by distillation from the naphthenic hydrocarbons generated in the cracking process, and in previous practice these hydrocarbons have been rejected along with the tar which has usually been disposed of as fuel oil. The presence of these paraffinic constituents in the tar has furthermore militated against its use in the manufacture of asphalts. By my process I am enabled to recycle these paraffinic constituents indefinitely without encountering difficulty from coke formation in the viscosity breaking furnace which has heretofore prevented recycling of such material. Furthermore, I am enabled to operate the tar flash tower 4 at a lower temperature and with a lower consumption of steam used in stripping than heretofore since it is not essential to distil off from this tar such a large percentage as previously. The recovery in the propane extractor of those constituents of the tar which were formerly incompletely recovered by distillation only, results in a definite increase in ultimate gasoline yield of from 1-3% based on the original charge. Also, because of the higher temperature possible in the viscosity breaking furnace the gasoline which is produced by my improved process possesses a higher antiknock rating of the order of 1% iso-octane equivalent.

In describing the solvent employed for recovering valuable high boiling hydrocarbon fractions from residual charging stock and viscosity breaker tar I have described the use of propane and preferably propane free from unsaturated constituents. However, I may use other liquefied hydrocarbon gases, particularly butane, in which case it is desirable to operate the said extraction at a higher temperature, preferably about 300° F. If I employ liquid ethane I find it important to operate at a temperature below 90° F. In the following claims I have described the use of propane but it should be understood that ethane or butane may be employed in my process, providing the extraction temperatures are properly adjusted in accordance with the specification and I also comprehend the use of mixtures of liquefied hydrocarbon gases.

It should be understood that my invention is equally applicable to a viscosity breaking conversion process wherein the charging stock is comprised of crude petroleum or topped crude petroleum and fractionated by flash distillation in one part of the cracking unit itself. Such an operation is illustrated in a publication by George Armistead, Jr., Oil and Gas Journal, November 2, 1933, page 11, Figure 2. In that case the residual oil which forms the charge to the viscosity breaking furnace is derived from the crude oil flash tower from which gas oil which forms part of the charge to the vapor phase cracking furnace is likewise obtained.

I may likewise apply my invention to a viscosity breaking conversion process wherein the oil and vapors discharged from the viscosity breaking furnace are introduced into an evaporating zone separate from the evaporating zone provided for the products from the vapor phase cracking furnace transfer line. In that case the residuum derived from the vapor phase operation is maintained separate and separately discharged from the unit without being subjected to the solvent action of propane, the propane treatment being applied only to the residue from the viscosity breaking operation. A cracking unit of this type is illustrated in U. S. application Serial No. 669,081, H. R. Snow, filed May 3, 1933, and in British Patent 425,726, Standard Oil Co. of Indiana, accepted March 20, 1935.

Although I have described the foregoing process with reference to a specific application, I intend that my invention be limited only by the following claims.

I claim:

1. The process of producing gasoline from the unvaporizable residual fractions of crude petroleum, comprising heating said crude petroleum residue to a temperature between 875-925° F. by passage through a pipe heater at high velocity, discharging the heated oil into an evaporating zone at lower pressure where gasoline and gas oil are removed from unevaporated heavy residue, separating said gasoline and gas oil in a suitable fractionating zone, heating said gas oil in a separate pipe heater to a temperature between 915-1050° F., introducing the vapors from said gas oil heater into said evaporating zone, cooling said unevaporated heavy residue and subjecting it to the solvent action of propane whereby valuable high molecular weight high boiling hydrocarbons are dissolved and undesirable coke forming asphaltic matter is rejected, introducing the resulting propane solution into contact with hot vapors within said evaporating zone whereby propane is removed and said high boiling hydrocarbons are heated, and withdrawing and recycling said heated high boiling hydrocarbons to said viscosity breaking heater.

2. The process according to claim 1 wherein the unevaporated residue from said evaporating zone is flashed in a tar flash zone at a still lower pressure to remove further quantities of gasoline producing oil which are subsequently cracked in the gas oil cracking zone and the heavier residue so obtained is subjected to extraction with propane as described.

FREDERICK W. SULLIVAN, Jr.